(12) United States Patent
Guen (10) Patent No.: US 9,159,984 B2
(45) Date of Patent: Oct. 13, 2015

(54) RECHARGEABLE BATTERY

(75) Inventor: Min-Hyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 655 days.

(21) Appl. No.: 13/421,773

(22) Filed: Mar. 15, 2012

(65) Prior Publication Data

US 2013/0136960 A1  May 30, 2013

Related U.S. Application Data

(60) Provisional application No. 61/563,724, filed on Nov. 25, 2011.

(51) Int. Cl.
*H01M 2/00* (2006.01)
*H01M 2/34* (2006.01)

(52) U.S. Cl.
CPC ........ *H01M 2/348* (2013.01); *H01M 2200/103* (2013.01)

(58) Field of Classification Search
CPC .......................... H01M 220/103; H01M 2/348
USPC .......................................................... 429/61
See application file for complete search history.

(56) References Cited

U.S. PATENT DOCUMENTS

| 5,604,051 A * | 2/1997 | Pulley et al. ................... 429/99 |
| 2004/0126650 A1* | 7/2004 | Kim ................................ 429/61 |
| 2008/0038628 A1* | 2/2008 | Yamauchi et al. .............. 429/56 |
| 2010/0233528 A1* | 9/2010 | Kim et al. ...................... 429/178 |
| 2011/0039152 A1* | 2/2011 | Kim et al. ...................... 429/178 |
| 2011/0183165 A1 | 7/2011 | Byun et al. |

FOREIGN PATENT DOCUMENTS

| EP | 1 498 927 A1 | 1/2005 |
| EP | 1498927 A1 * | 1/2005 |
| JP | 2002-358863 A | 12/2002 |
| JP | 2003-007192 A | 1/2003 |
| JP | 2010-108786 A | 5/2010 |

OTHER PUBLICATIONS

European Office Action (extended European Search Report), dated Mar. 19, 2013, for Application No. 12160467.2-1359, 6 pages.

* cited by examiner

*Primary Examiner* — Jonathan Jelsma
*Assistant Examiner* — Rashid Alam
(74) *Attorney, Agent, or Firm* — Christie, Parker & Hale, LLP (57) ABSTRACT

A rechargeable battery including an electrode assembly; a case containing the electrode assembly; a cap plate covering an opening of the case; and a current collecting member including a current collecting portion coupled to the electrode assembly; a terminal coupling portion extending from the current collecting portion at a corner portion of the current collecting member, the corner portion extending in a first direction along a width of the current collecting member; and a fuse portion, the current collecting member having a fuse hole formed therein adjacent the fuse portion, a centerline of the fuse hole extending through the fuse portion in a direction crossing the first direction.

17 Claims, 7 Drawing Sheets

RECHARGEABLE BATTERY

CROSS-REFERENCE TO RELATED APPLICATION

This application claims priority to and the benefit of U.S. Provisional Application No. 61/563,724, filed on Nov. 25, 2011 in the United States Patent and Trademark Office, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery that is incapable of being recharged. A low-capacity rechargeable battery is commonly used for a small portable electronic device such as a mobile phone, a laptop computer, or a camcorder, and a large-capacity battery is widely used as a power source for driving a motor, such as a motor of an electric vehicle, a hybrid vehicle, etc.

A high-power rechargeable battery using a non-aqueous electrolyte of a high energy density has been developed, and the high-power rechargeable battery is formed as a large-capacity rechargeable battery by coupling in series a plurality of rechargeable batteries to use for driving a motor of a device, such as an electric vehicle or hybrid vehicle requiring a large amount of electric power.

Further, one large-capacity rechargeable battery is generally formed as a plurality of rechargeable batteries that are coupled in series, and the rechargeable battery may be formed in a cylindrical shape or a square shape, for example.

When an overcurrent flows within the rechargeable battery having a case that is made of a material such as a metal, a temperature of the rechargeable battery rises, and thus a danger of ignition exists. Further, when an internal pressure of the rechargeable battery rises, such as because of decomposition of an electrolyte solution within the rechargeable battery due to an overcurrent, there is a danger that the rechargeable battery may explode.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery has improved safety. According to another aspect of embodiments of the present invention, a rechargeable battery has an improved structure of a safety apparatus that can reduce a danger when an overcurrent occurs.

According to an exemplary embodiment of the present invention, a rechargeable battery includes: an electrode assembly; a case containing the electrode assembly; a cap plate covering an opening of the case; and a current collecting member including a current collecting portion coupled to the electrode assembly; a terminal coupling portion extending from the current collecting portion at a corner portion of the current collecting member, the corner portion extending in a first direction along a width of the current collecting member; and a fuse portion, the current collecting member having a fuse hole formed therein adjacent the fuse portion, a centerline of the fuse hole extending through the fuse portion in a direction crossing the first direction.

The fuse hole may be asymmetric with respect to a centerline of the fuse portion extending in the first direction.

A cross-sectional area of the fuse portion may be smaller than that of other portions of the current collecting member.

In one embodiment, a rechargeable battery further includes an electrode terminal electrically connected to the electrode assembly and protruding through the cap plate to an outside of the case, and the electrode terminal is coupled to the terminal coupling portion. The electrode terminal may include a flange between the terminal coupling portion and the cap plate, and a pillar extending from a first side of the flange and protruding through the cap plate to the outside of the case.

In one embodiment, the electrode terminal further includes a support protrusion protruding from a second side of the flange opposite the first side, and the terminal coupling portion has a hole formed therein, and the support protrusion is received in the hole to couple the terminal coupling portion and the electrode terminal together.

In one embodiment, a rechargeable battery further includes an insulation member between the current collecting member and the cap plate, and the insulation member has a first groove receiving the terminal coupling portion therein, a second groove receiving the flange therein, and a terminal hole receiving the pillar therethrough.

The terminal coupling portion may extend substantially perpendicularly from the current collecting portion to form the corner portion.

The fuse portion may be formed at the terminal coupling portion.

The centerline of the fuse hole may extend in a direction oblique to the first direction.

The fuse portion may include a first fuse portion at a first side of the current collecting member, and a second fuse portion at a second side of the current collecting member opposite the first side. A distance between the first fuse portion and the corner portion may be greater than a distance between the second fuse portion and the corner portion.

In one embodiment, the fuse hole is formed between the first and second fuse portions, and a distance between the corner portion and a first end of the fuse hole adjacent the first fuse portion is greater than a distance between the corner portion and a second end of the fuse hole adjacent the second fuse portion.

The fuse hole may be formed between the first and second fuse portions and may include a first fuse hole portion adjacent the first fuse portion, a second fuse hole portion adjacent the second fuse portion, and a third fuse hole portion extending between the first and second fuse hole portions. The first and second fuse hole portions may extend in a direction substantially parallel to the first direction, and the third fuse hole portion may extend between the first and second fuse hole portions in a direction oblique to the first direction.

In one embodiment, the fuse hole includes a first fuse hole formed at a first side of the current collecting member, and a second fuse hole formed at a second side of the current collecting member opposite the first side, and the fuse portion is between the first and second fuse holes. A distance between the first fuse hole and the corner portion may be greater than a distance between the second fuse hole and the corner portion.

The fuse hole may further include a third fuse hole formed between the first and second fuse holes, and the fuse portion may include a first fuse portion between the first fuse hole and the third fuse hole, and a second fuse portion between the second fuse hole and the third fuse hole.

A distance between the third fuse hole and the corner portion may be greater than a distance between the first fuse hole and the corner portion and a distance between the second fuse hole and the corner portion.

The rechargeable battery may be adapted for use as a motor-driving power source for propelling an electric vehicle or a hybrid electric vehicle.

According to another embodiment of the present invention, a rechargeable battery includes: an electrode assembly including a positive electrode and a negative electrode, a case that houses the electrode assembly, a cap plate that is coupled to the case, a cap assembly including a terminal that is protruded to the outside, and a current collecting member that is electrically connected to the electrode assembly and that has a fuse hole, wherein the current collecting member includes a terminal bonding portion that is fixed to the terminal and a connection plate that is bent from the terminal bonding portion, and a center line of the fuse hole is formed in a direction intersecting a corner of the terminal bonding portion and the connection plate.

According to an aspect of embodiments of the present invention, because a fuse portion is formed in a current collecting member, safety is improved and strength of a current collecting member is improved, and thus the current collecting member is prevented or substantially prevented from being damaged by an external impact or vibration. As such, a rechargeable battery according to embodiments of the present invention is particularly suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

DESCRIPTION OF REFERENCE NUMERALS INDICATING SOME ELEMENTS IN THE DRAWINGS

| | |
|---|---|
| 101: rechargeable battery | 10: electrode assembly |
| 11: positive electrode | 11a: positive electrode uncoated region |
| 12: negative electrode | 12a: negative electrode uncoated region |
| 13: separator | 21: positive terminal |
| 21a: terminal flange | 21b: terminal pillar |
| 21c: support protrusion | 22: negative terminal |
| 24: washer | 25: first gasket |
| 26: case | 27: electrolyte injection opening |
| 28: second gasket | 29: nut |
| 30: cap assembly | 31: cap plate |
| 38: seal stopper | 39: vent member |
| 39a: notch | 40, 50, 70, 80, 90: current collecting member |
| 41, 71, 81, 91: terminal coupling portion | |
| 42, 72, 82, 92: current collecting portion | |
| 43, 73, 83, 93: connection portion | 44, 74, 84, 94: fuse portion |
| 44a, 74a, 94a: first fuse portion | 44b, 74b, 94b: second fuse portion |
| 45, 46, 75, 76, 85, 86, 95, 96: current collecting piece | |
| 47, 77, 87, 97: coupling hole | 48, 78, 88, 98: fuse hole |
| 48a: first fuse hole portion | 48b: second fuse hole portion |
| 48c: third fuse hole portion | 61: lower insulation member |
| 61a: coupling groove | 61b: flange groove |
| 61c: terminal hole | 78a: one side end portion |
| 78b: another side end portion | 88a, 98a: first fuse hole |
| 88b, 98b: second fuse hole | 98c: third fuse hole |

DETAILED DESCRIPTION

The present invention will be described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
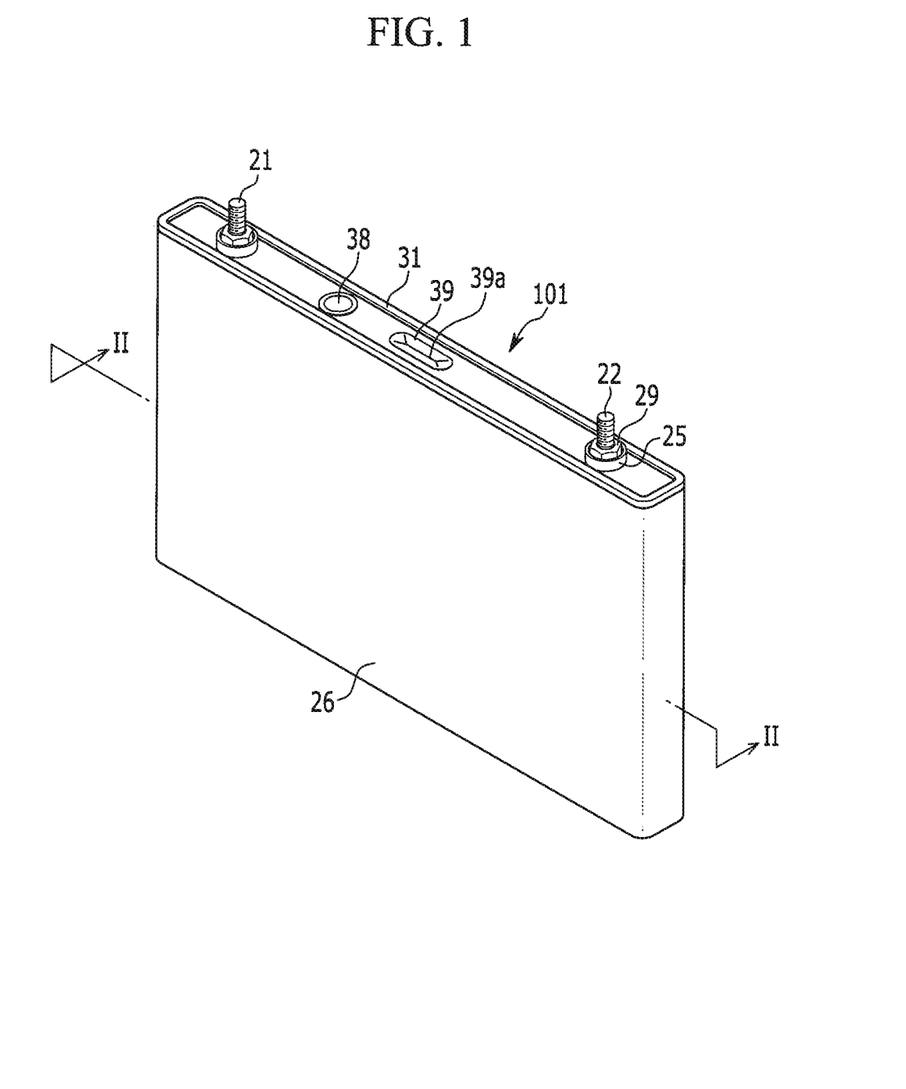
FIG. 1 is a perspective view of a rechargeable battery according to an exemplary embodiment of the present invention.
Figure 2:
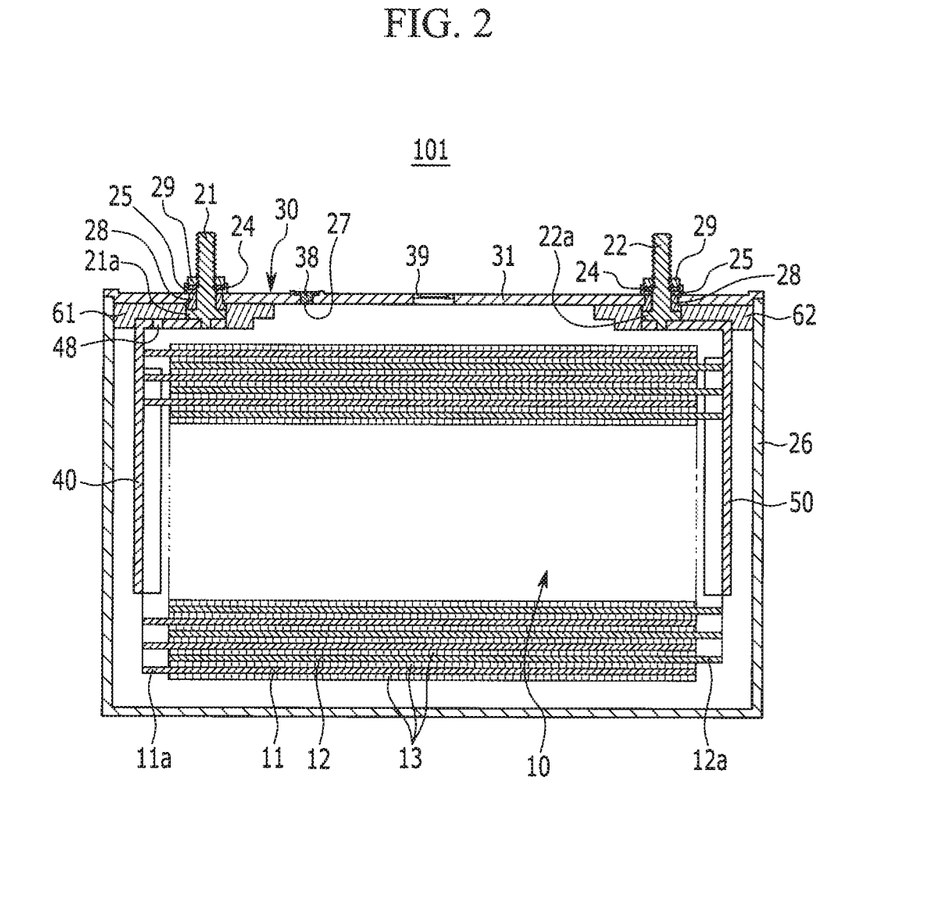
FIG. 2 is a cross-sectional view of the rechargeable battery of FIG. 1, taken along the line II-II.

FIG. 1 is a perspective view of a rechargeable battery according to an exemplary embodiment of the present invention, and FIG. 2 is a cross-sectional view of the rechargeable battery of FIG. 1, taken along the line II-II.

Referring to FIGS. 1 and 2, a rechargeable battery 101 according to an exemplary embodiment of the present invention includes an electrode assembly 10 that may be wound (e.g., spiral-wound) by interposing a separator 13 between a positive electrode 11 and a negative electrode 12, a case 26 that houses the electrode assembly 10 therein, and a cap assembly 30 that is coupled to an opening of the case 26.

The rechargeable battery 101 according to one embodiment has, for example, a generally square or rectangular shape as a lithium ion rechargeable battery. However, the present invention is not limited thereto and embodiments of the present invention can be applied to batteries of various forms, such as a lithium polymer battery or a cylindrical battery.

The positive electrode 11 and the negative electrode 12, in one embodiment, include a respective coated region, which is an area in which an active material is applied to a current collector that is formed of a thin plate metal foil, and positive and negative electrode uncoated regions 11a and 12a, which are areas in which an active material is not applied.

In one embodiment, the positive electrode uncoated region 11a is formed at one side end of the positive electrode 11 in a lengthwise direction of the positive electrode 11, and the negative electrode uncoated region 12a is formed at the other side end of the negative electrode 12 in a lengthwise direction of the negative electrode 12. The positive electrode 11 and the negative electrode 12, in one embodiment, are wound (e.g., spiral-wound) with the separator 13, which is an insulator, interposed therebetween.

However, the present invention is not limited thereto, and the electrode assembly 10 may be formed having a structure in which a positive electrode and a negative electrode that are formed with a plurality of sheets are stacked with a separator disposed therebetween.

The case 26, in one embodiment, is formed having an approximately cuboid shape and has an opening at an end thereof. The cap assembly 30 includes a cap plate 31 that covers the opening of the case 26, a positive terminal 21 that is protruded to the outside of the cap plate 31 and that is electrically connected to the positive electrode 11, a negative terminal 22 that is protruded to the outside of the cap plate 31 and that is electrically connected to the negative electrode 12, and a vent member 39 that has a notch 39a configured to be broken according to an internal pressure (e.g., at a predetermined internal pressure).

In one embodiment, the cap plate 31 is formed as a thin plate having an electrolyte injection opening 27 for injecting an electrolyte solution formed at one side thereof, and a seal stopper 38 for sealing the electrolyte injection opening 27 fixed to and installed in the cap plate 31.

In one embodiment, the positive terminal 21 is installed to penetrate the cap plate 31, and a first gasket 25 that is positioned at an upper part between the cap plate 31 and the positive terminal 21 and a second gasket 28 that is positioned at a lower part between the cap plate 31 and the positive terminal 21 insulate the cap plate 31 and the positive terminal 21.

The positive terminal 21, in one embodiment, is formed having a generally cylindrical shape, a nut 29 that supports the positive terminal 21 in an upper part is installed on the positive terminal 21, and a screw thread for fastening the nut 29 is formed at an external circumference of the positive terminal 21. A washer 24, in one embodiment, is installed between the nut 29 and the first gasket 25.

The positive terminal 21 is electrically connected to the positive electrode uncoated region 11a via a current collecting member 40 connected therebetween, and a terminal flange 21a that supports the positive terminal 21 and the current collecting member 40 is formed at a lower end of the positive terminal 21.

In one embodiment, the negative terminal 22 is installed to penetrate the cap plate 31, and the first gasket 25 that is positioned at an upper part between the cap plate 31 and the negative terminal 22 and the second gasket 28 that is positioned at a lower part between the cap plate 31 and the negative terminal 22 insulate the cap plate 31 and the negative terminal 22.

The negative terminal 22, in one embodiment, is formed having a generally cylindrical shape, the nut 29 that supports the negative terminal 22 in an upper part is installed on the negative terminal 22, and a screw thread for fastening the nut 29 is formed at an external circumference of the negative terminal 22. The washer 24, in one embodiment, is installed between the nut 29 and the first gasket 25.

The negative terminal 22 is electrically connected to the negative electrode uncoated region 12a via a current collecting member 50 connected therebetween, and a terminal flange 22a that supports the negative terminal 22 and the current collecting member 50 is formed at a lower end of the negative terminal 22.

Figure 3:
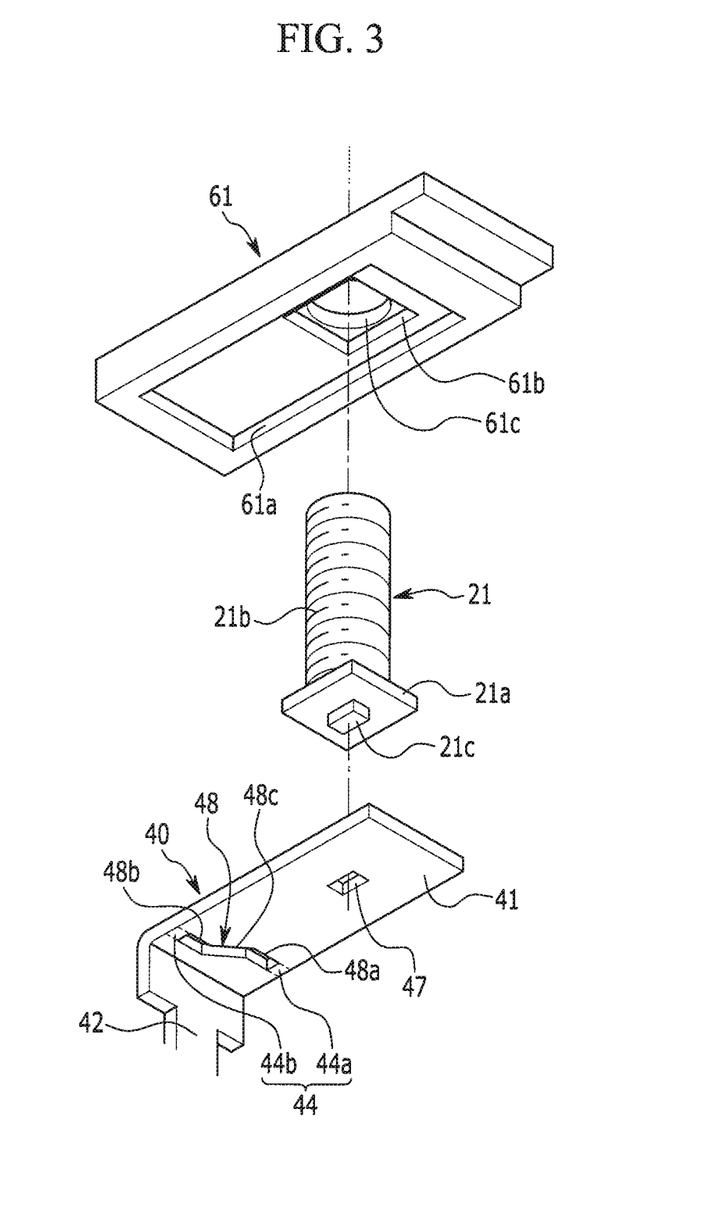
FIG. 3 is an exploded perspective view of a portion of the rechargeable battery of FIG. 1.

FIG. 3 is an exploded perspective view of a portion of the rechargeable battery 101.

Referring to FIG. 3, the positive terminal 21, in one embodiment, includes a terminal pillar 21b that is protruded from the terminal flange 21a and has an external circumferential surface having a screw thread, and a support protrusion 21c that is protruded from the bottom of the terminal flange 21a toward the bottom of the case 26.

In one embodiment, a lower insulation member 61 is arranged at a lower side of the cap plate 31 and has a coupling groove 61a that receives a terminal coupling portion 41 of the current collecting member 40, a flange groove 61b that receives the terminal flange 21a at an upper end of the coupling groove 61a, and a terminal hole 61c that receives the terminal pillar 21b therethrough. As shown in FIG. 2, in one embodiment, a lower insulation member 62 is similarly arranged between the cap plate 31 and the current collecting member 50 and the negative terminal 22.

Figure 4:
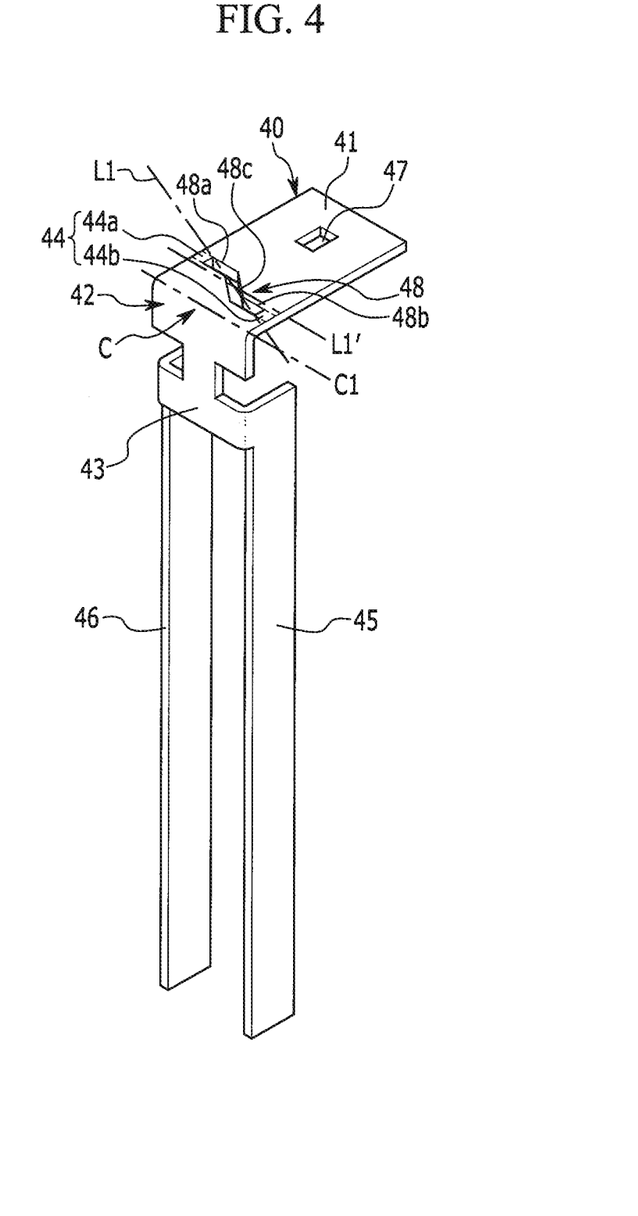
FIG. 4 is a perspective view of a current collecting member of the rechargeable battery of FIG. 1.

As shown in FIG. 4, the current collecting member 40, in one embodiment, includes a terminal coupling portion 41 that is fixed to the positive terminal 21, a current collecting portion 42 that is bent from the terminal coupling portion 41, a connection portion 43 that is formed in a lower portion of the current collecting portion 42, and current collecting pieces 45 and 46 that are bent at both side ends of the connection portion 43 and that are attached to the positive electrode uncoated region 11a.

The current collecting member 50, in one embodiment, that is connected to the negative terminal 22 has the same structure as that of the current collecting member 40, except that a fuse hole 48 may be omitted, and therefore further description of the current collecting member 50 is omitted.

The terminal coupling portion 41, in one embodiment, is formed having a generally quadrangular plate shape and has a coupling hole 47 that receives the positive terminal 21 at the center. The support protrusion 21c is inserted in the coupling hole 47 and is coupled (e.g., welded) to the terminal coupling portion 41 at the coupling hole 47. The fuse hole 48 is formed in the terminal coupling portion 41, and a fuse portion 44 is formed at both side ends of the fuse hole 48.

The current collecting portion 42, in one embodiment, is perpendicularly bent from the terminal coupling portion 41 toward the bottom of the case 26 and is disposed parallel to a side surface of the case 26. The connection portion 43, in one embodiment, is formed at the lower end of the current collecting portion 42 and is disposed parallel to the current collecting portion 42. Current collecting pieces 45 and 46 extend from both side ends of the connection portion 43 and are coupled (e.g., welded) to the positive electrode uncoated region 11a.

The fuse hole 48, in one embodiment, includes a first fuse hole portion 48a that is spaced apart from one side of the terminal coupling portion 41, a second fuse hole portion 48b that is spaced apart the first fuse hole portion 48a and that is spaced apart from an opposite side of the terminal coupling portion 41 and that is connected to the first fuse hole portion 48a in a widthwise direction of the terminal coupling portion 41, and a third fuse hole portion 48c that connects the first fuse hole portion 48a and the second fuse hole portion 48b in the widthwise direction of the terminal coupling portion 41.

The first fuse hole portion 48a and the second fuse hole portion 48b are formed at different positions in a lengthwise direction of the terminal coupling portion 41. That is, a distance between the first fuse hole portion 48a and the current collecting portion 42 is greater than that between the second fuse hole portion 48b and the current collecting portion 42. Accordingly, the third fuse hole portion 48c is formed oblique to the first fuse hole portion 48a and the second fuse hole portion 48b. As described above, the fuse hole 48 is formed in an asymmetric structure to a centerline of a widthwise direction of the current collecting member 40.

In one embodiment, a centerline L1 of the fuse hole 48 is formed in a direction crossing or intersecting a widthwise direction C1 in which a corner portion C at which the terminal coupling portion 41 and the current collecting portion 42 meet extends along a width of the current collecting member 40. The centerline L1 of the fuse hole 48 is defined as a line that connects the center of the first fuse hole portion 48a and the center of the second fuse hole portion 48b. A centerline L1 direction of the fuse hole 48 is weakest to a vertical direction stress, and when the centerline L1 is formed in a direction crossing or intersecting the widthwise direction C1 in which the corner portion C extends, strength to a vertical direction stress is improved. In one embodiment, the centerline L1 of the fuse hole 48 extends in a direction oblique to the widthwise direction C1 in which the corner portion C extends along a width of the current collecting member 40.

The fuse portion 44, in one embodiment, includes a first fuse portion 44a that is formed between the first fuse hole portion 48a and one side of the terminal coupling portion 41, and a second fuse portion 44b that is formed between the second fuse hole portion 48b and the other side end of the terminal coupling portion 41.

The first fuse portion 44a and the second fuse portion 44b are formed at different positions in a lengthwise direction of the terminal coupling portion 41 according to one embodiment. That is, a distance between the first fuse portion 44a and the current collecting portion 42 is greater than that between the second fuse portion 44b and the current collecting portion 42. In one embodiment, the fuse hole 48 is asymmetric with respect to a centerline L1' of the fuse portion 44 extending in the widthwise direction C1.

In an exemplary embodiment of the present invention, the first fuse portion 44a and the second fuse portion 44b are formed at different positions in a lengthwise direction of the terminal coupling portion 41, and the fuse portion 44 is prevented or substantially prevented from being damaged.

If the fuse portion were formed in a straight line, a vertical direction stress that is applied to the fuse portion increases and thus the fuse portion may be damaged by a vibration or an impact. In order to prevent this, a cross-sectional area of the fuse portion may be formed to be large, but in such a case, if a problem occurs, a problem that the fuse portion is not melted may occur.

In the rechargeable battery 101 according to an exemplary embodiment of the present invention, when the first fuse portion 44a and the second fuse portion 44b are formed at different positions in a lengthwise direction of the terminal coupling portion 41, a portion adjacent to the fuse portion 44 disperses and supports a vertical direction stress, and thus the fuse portion 44 is prevented or substantially prevented from being damaged. As such, a rechargeable battery according to embodiments of the present invention is particularly suited for application in an electric vehicle or a hybrid electric vehicle.

When an overcurrent flows due to a short circuit, etc., a current passes through the first fuse portion 44a and the second fuse portion 44b and moves to the positive terminal 21 and thus the first fuse portion 44a and the second fuse portion 44b having a cross-sectional area smaller than that of a neighboring portion are melted and thus a flow of a current is interrupted.

Figure 5:
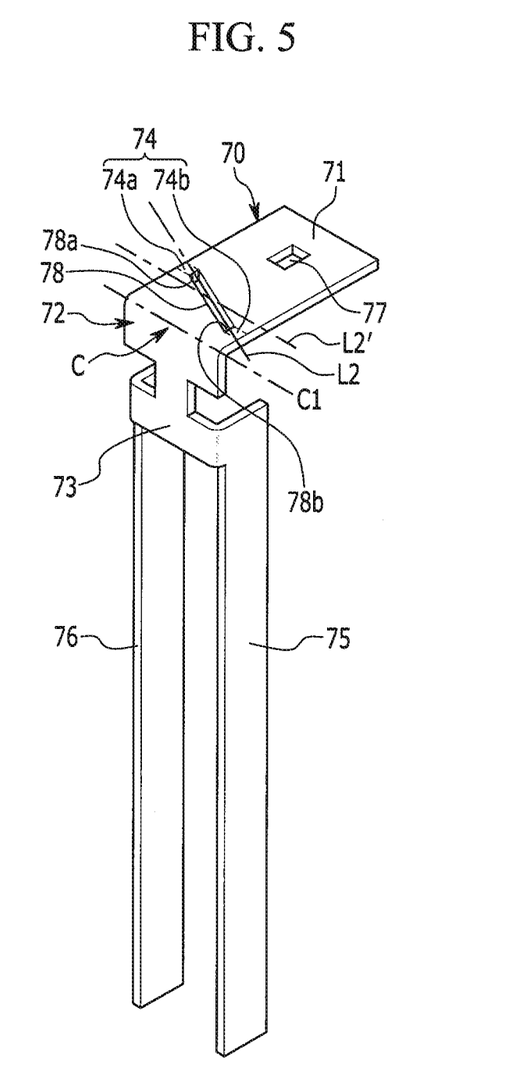
FIG. 5 is a perspective view of a current collecting member of a rechargeable battery according to another exemplary embodiment of the present invention.

FIG. 5 is a perspective view of a current collecting member of a rechargeable battery according to another exemplary embodiment of the present invention.

As shown in FIG. 5, a current collecting member 70 according to another exemplary embodiment of the present invention includes a terminal coupling portion 71 that is fixed to the positive terminal 21, a current collecting portion 72 that is bent away from the terminal coupling portion 71, a connection portion 73 that is formed in a lower portion of the current collecting portion 72, and current collecting pieces 75 and 76 that are bent at both side ends of the connection portion 73 and that are attached to the positive electrode uncoated region 11a.

The terminal coupling portion 71, in one embodiment, is formed having a generally quadrangular plate shape and has a coupling hole 77 for inserting the positive terminal 21 at the center. The support protrusion 21c is inserted into the coupling hole 77 and is coupled (e.g., welded) to the terminal coupling portion 71 at the coupling hole 77. Further, a fuse hole 78 is formed in the terminal coupling portion 71, and a fuse portion 74 is formed at both side ends of the fuse hole 78.

The current collecting portion 72 is bent (e.g., perpendicularly bent) toward the bottom of the case 26 from the terminal coupling portion 71 and is disposed parallel to a side surface of the case 26. The connection portion 73, in one embodiment, is formed at a lower end of the current collecting portion 72 and is disposed parallel to the current collecting portion 72. At both side ends of the connection portion 73, current collecting pieces 75 and 76 that are coupled (e.g., welded) to the positive electrode uncoated region 11a are formed.

One side end portion 78a of the fuse hole 78 is spaced apart from one side of the terminal coupling portion 71, and the other side end portion 78b of the fuse hole 78 is spaced apart from the other side of the terminal coupling portion 71. The one side end portion 78a and the other side end portion 78b of the fuse hole 78 are formed at different positions in a lengthwise direction of the terminal coupling portion 71.

That is, a distance between the one side end portion 78a of the fuse hole 78 and the current collecting portion 72 is greater than that between the other side end portion 78b of the fuse hole 78 and the current collecting portion 72. Accordingly, the fuse hole 78 is formed oblique to the side end of the terminal coupling portion 71. As described above, the fuse hole 78 is formed in an asymmetric structure to a centerline of a widthwise direction of the current collecting member 70.

In one embodiment, a centerline L2 of the fuse hole 78 is formed in a direction crossing or intersecting a widthwise direction C1 in which a corner portion C at which the terminal coupling portion 71 and the current collecting portion 72 meet extends along a width of the current collecting member 70. The centerline L2 of the fuse hole 78 is defined as a straight line that connects a width direction center of the fuse hole 78. A centerline L2 direction of the fuse hole 78 is weakest to a vertical direction stress, and when the centerline L2 is formed in a direction crossing or intersecting the widthwise direction C1 in which the corner portion C extends, strength of a vertical direction stress is improved. In one embodiment, the centerline L2 of the fuse hole 78 extends in a direction oblique to the widthwise direction C1 in which the corner portion C extends along a width of the current collecting member 70.

The fuse portion 74, in one embodiment, includes a first fuse portion 74a that is formed between one side end portion 78a of the fuse hole 78 and one side of the terminal coupling portion 71 and a second fuse portion 74b that is formed between the other side end portion 78b of the fuse hole 78 and the other side of the terminal coupling portion 71. Because the first fuse portion 74a and the second fuse portion 74b are formed between an end portion of the fuse hole 78 and a side of the terminal coupling portion 71, the first fuse portion 74a and the second fuse portion 74b have a cross-sectional area that is smaller than that of a neighboring portion.

The first fuse portion 74a and the second fuse portion 74b are formed at different positions in a lengthwise direction of the terminal coupling portion 71 according to one embodiment. That is, a distance between the first fuse portion 74a and the current collecting portion 72 is greater than that between the second fuse portion 74b and the current collecting portion 72. In one embodiment, the fuse hole 78 is asymmetric with respect to a centerline L2' of the fuse portion 44 extending in the widthwise direction C1.

In an exemplary embodiment of the present invention, the first fuse portion 74a and the second fuse portion 74b are formed at different positions in a lengthwise direction of the terminal coupling portion 71, and the fuse portion 74 is prevented or substantially prevented from being damaged.

If the fuse portion were formed in a straight line, a vertical direction stress that is applied to the fuse portion increases and thus the fuse portion may be damaged by a vibration or an impact. In order to prevent this, a cross-sectional area of the fuse portion may be formed to be large, but in such a case, if a problem occurs, a problem that the fuse portion is not melted may occur.

In the current collecting member 70 according to an exemplary embodiment of the present invention, the first fuse portion 74a and the second fuse portion 74b are formed at different positions in a lengthwise direction of the terminal coupling portion 71, and a portion adjacent to the fuse portion 74 disperses and supports a vertical direction stress and thus the fuse portion 74 can be prevented or substantially prevented from being damaged.

Figure 6:
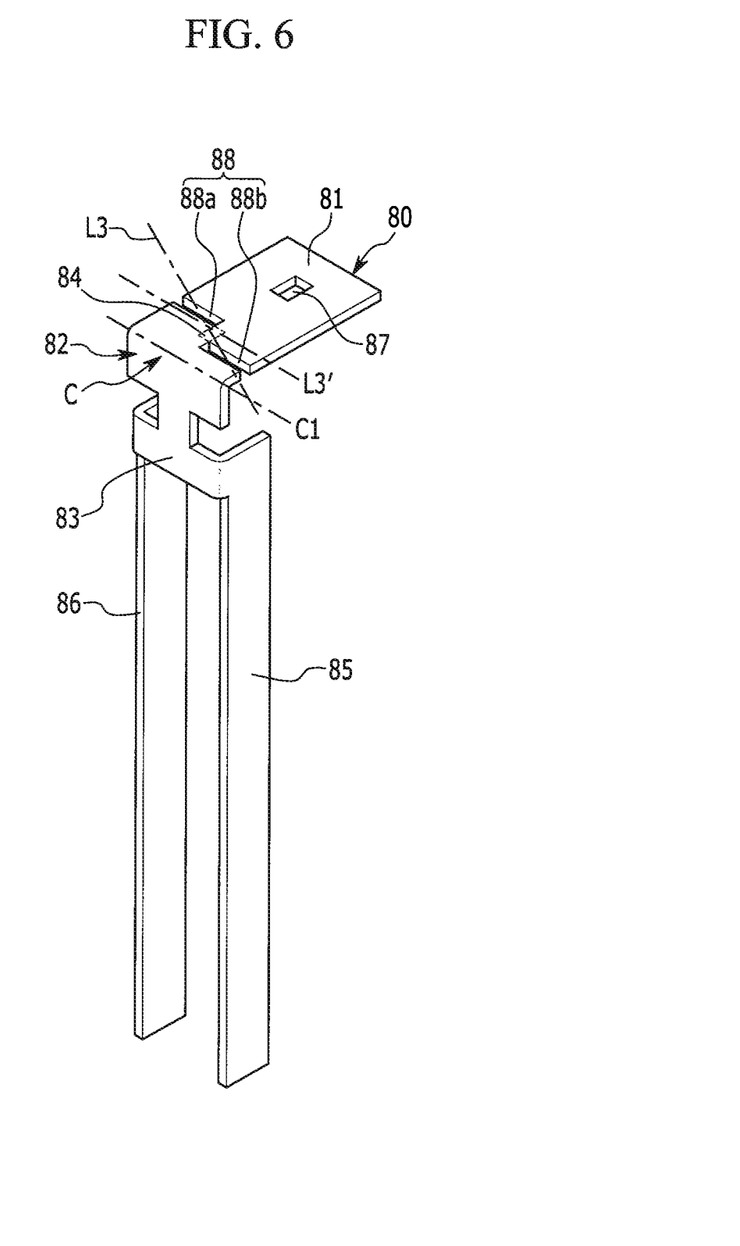
FIG. 6 is a perspective view of a current collecting member of a rechargeable battery according to another exemplary embodiment of the present invention.

FIG. 6 is a perspective view of a current collecting member of a rechargeable battery according to another exemplary embodiment of the present invention.

As shown in FIG. 6, a current collecting member 80 according to another exemplary embodiment of the present invention includes a terminal coupling portion 81 that is fixed to the positive terminal 21, a current collecting portion 82 that is bent away from the terminal coupling portion 81, a connection portion 83 that is formed in a lower portion of the current collecting portion 82, and current collecting pieces 85 and 86 that are bent at both side ends of the connection portion 83 and that are attached to the positive electrode uncoated region 11a.

The terminal coupling portion 81, in one embodiment, is formed having a generally quadrangular plate shape and has a coupling hole 87 for inserting the positive terminal 21 at the center. The support protrusion 21c is inserted into the coupling hole 87 and is coupled (e.g., welded) to the terminal coupling portion 81 at the coupling hole 87. Further, a fuse hole 88 is formed in the terminal coupling portion 81. The fuse hole 88 includes a first fuse hole 88a and a second fuse hole 88b, and a fuse portion 84 is formed between the first fuse hole 88a and the second fuse hole 88b.

The current collecting portion 82 is bent (e.g., perpendicularly bent) toward the bottom of the case 26 from the terminal coupling portion 81 and, in one embodiment, is disposed parallel to a side surface of the case 26. The connection portion 83 is formed at a lower end of the current collecting portion 82 and is disposed parallel to the current collecting portion 82. At both side ends of the connection portion 83, current collecting pieces 85 and 86 that are coupled (e.g., welded) to the positive electrode uncoated region 11a are formed.

The first fuse hole 88a is formed from one side of the terminal coupling portion 81 in a widthwise direction of the terminal coupling portion 81, and the second fuse hole 88b is formed in a widthwise direction of the terminal coupling portion 81 from the other side of the terminal coupling portion 81.

The first fuse hole 88a and the second fuse hole 88b are formed at different positions in a lengthwise direction of the terminal coupling portion 81. That is, a distance between the first fuse hole 88a and the current collecting portion 82 is greater than that between the second fuse hole 88b and the current collecting portion 82.

As described above, the fuse hole 88 has an asymmetric structure to a centerline of a widthwise direction of the current collecting member 80.

In one embodiment, a centerline L3 of the fuse hole 88 is formed in a direction crossing or intersecting a widthwise direction C1 in which a corner portion C at which the terminal coupling portion 81 and the current collecting portion 82 meet extends along a width of the current collecting member 80. The centerline L3 of the fuse hole 88 is defined as a line that connects a center of the first fuse hole 88a and a center of the second fuse hole 88b. A centerline L3 direction of the fuse hole 88 is weakest to a vertical direction stress, and when the centerline L3 is formed in a direction crossing or intersecting the widthwise direction C1 in which the corner portion C extends, strength of a vertical direction stress is improved. In one embodiment, the centerline L3 of the fuse hole 88 extends in a direction oblique to the widthwise direction C1 in which the corner portion C extends along a width of the current collecting member 80.

The first fuse hole 88a and the second fuse hole 88b are separately disposed, or spaced apart from each other, and thus the fuse portion 84 having a cross-sectional area smaller than that of neighboring portions is formed between the first fuse hole 88a and the second fuse hole 88b. Because a portion adjacent to the fuse portion 84 disperses and supports a vertical direction stress, the fuse portion 84 can be prevented or substantially prevented from being damaged. In one embodiment, the fuse hole 88 is asymmetric with respect to a centerline L3' of the fuse portion 84 extending in the widthwise direction C1.

Figure 7:
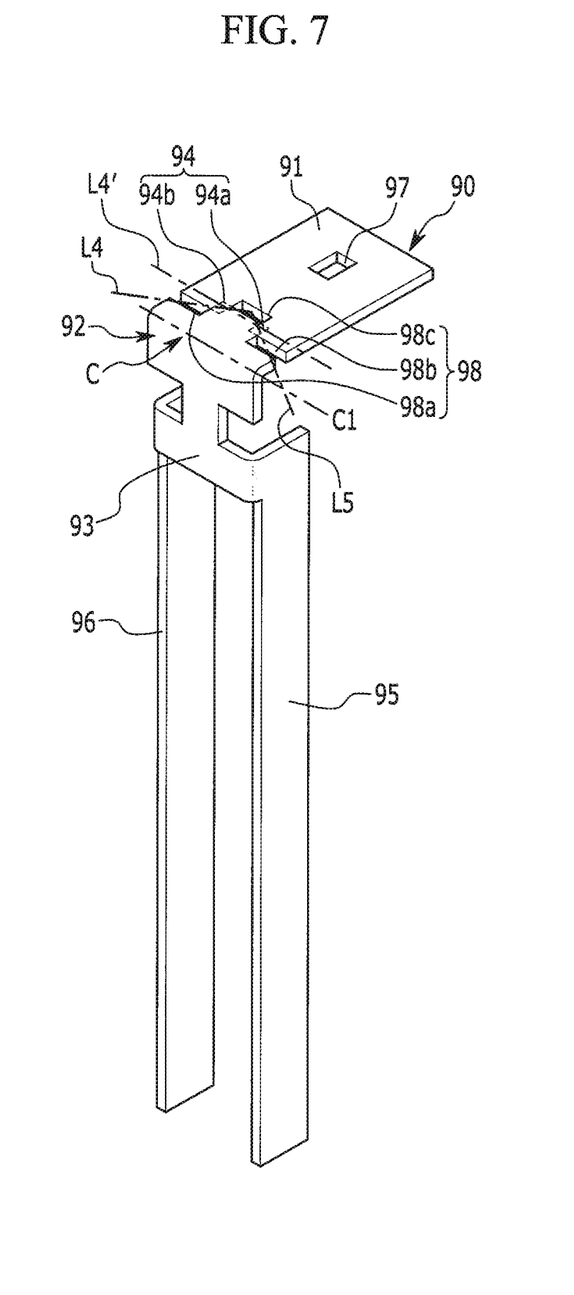
FIG. 7 is a perspective view of a current collecting member of a rechargeable battery according to another exemplary embodiment of the present invention.

FIG. 7 is a perspective view of a current collecting member of a rechargeable battery according to another exemplary embodiment of the present invention.

As shown in FIG. 7, a current collecting member 90 according to another exemplary embodiment of the present invention includes a terminal coupling portion 91 that is fixed to the positive electrode 21, a current collecting portion 92 that is bent away from the terminal coupling portion 91, a connection portion 93 that is formed in a lower portion of the current collecting portion 92, and current collecting pieces 95 and 96 that are bent at both side ends of the connection portion 93 and that are attached to the positive electrode uncoated region 11a.

The terminal coupling portion 91, in one embodiment, is formed having a generally quadrangular plate shape and has a coupling hole 97 for inserting the positive terminal 21 at the center. The support protrusion 21c is inserted into the coupling hole 97 and is coupled (e.g., welded) to the terminal coupling portion 91 at the coupling hole 97. Further, a fuse hole 98 is formed in the terminal coupling portion 91.

The fuse hole 98 includes a first fuse hole 98a, a second fuse hole 98b, and a third fuse hole 98c, and a fuse portion 94 is formed between the first fuse hole 98a and the third fuse hole 98c and between the second fuse hole 98b and the third fuse hole 98c.

The current collecting portion 92 is bent (e.g., perpendicularly bent) from the terminal coupling portion 91 toward the bottom of the case 26 and, in one embodiment, is disposed parallel to a side surface of the case 26. The connection portion 93 is formed at the lower end of the current collecting portion 92 and is disposed parallel to the current collecting portion 92. At both side ends of the connection portion 93, current collecting pieces 95 and 96 that are coupled (e.g., welded) to the positive electrode uncoated region 11a are formed.

The first fuse hole 98a is formed in a widthwise direction of the terminal coupling portion 91 from one side of the terminal coupling portion 81, and the second fuse hole 98b is formed in a widthwise direction of the terminal coupling portion 91 from the other side of the terminal coupling portion 91. Further, the third fuse hole 98c is formed at the center of a widthwise direction of the terminal coupling portion 91.

The first fuse hole 98a and the second fuse hole 98b, in one embodiment, are formed at the same position in a lengthwise direction of the terminal coupling portion 91, and the third fuse hole 98c is formed at a different position in a lengthwise direction of the terminal coupling portion 91 from the position of the first fuse hole 98a and the second fuse hole 98b.

In one embodiment, a distance between the third fuse hole 98c and the current collecting portion 92 is greater than that between the first fuse hole 98a and the second fuse hole 98b and the current collecting portion 92.

Further, a first centerline L4 that connects the center of the first fuse hole 98a and the third fuse hole 98c is formed in a direction crossing or intersecting a widthwise direction C1 in which a corner portion C at which the terminal coupling portion 91 and the current collecting portion 92 meet extends along a width of the current collecting member 90, and a second center line L5 that connects the center of the second fuse hole 98b and the third fuse hole 98c is formed in a direction crossing or intersecting the widthwise direction C1 in which the corner portion C at which the terminal coupling portion 91 and the current collecting portion 92 meet extends along a width of the current collecting member 90.

A direction that connects the center of the fuse holes 98a, 98b, and 98c is weakest to a vertical direction stress, and when the center lines L4 and L5 are formed in a direction crossing or intersecting the widthwise direction C1 in which the corner portion C extends, strength to a vertical direction stress is improved. In one embodiment, the centerlines L4 and L5 of the fuse hole 98 extend in directions oblique to the widthwise direction C1 in which the corner portion C extends along a width of the current collecting member 90.

The first fuse hole 98a and the third fuse hole 98c are spaced apart from each other such that a first fuse portion 94a of the fuse portion 94 having a cross-sectional area smaller than that of neighboring portions is formed between the first fuse hole 98a and the third fuse hole 98c. Further, the second fuse hole 98b and the third fuse hole 98c are spaced apart from each other such that a second fuse portion 94b of the fuse portion 94 having a cross-sectional area smaller than that of neighboring portions is formed between the second fuse hole 98b and the third fuse hole 98c. In one embodiment, the fuse hole 98 is asymmetric with respect to a centerline L4' of the fuse portion 94 extending in the widthwise direction C1.

In the current collecting member 90, according to an exemplary embodiment of the present invention, because a portion adjacent to the fuse portion 94 disperses and supports a vertical direction stress, the fuse portion 94 can be prevented or substantially prevented from being damaged.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
   an electrode assembly;
   a case containing the electrode assembly;
   a cap plate covering an opening of the case; and
   a current collecting member comprising:
      a current collecting portion coupled to the electrode assembly;
      a terminal coupling portion extending substantially perpendicularly from the current collecting portion to form a corner portion of the current collecting member, the corner portion extending in a first direction along a width of the current collecting member, the terminal coupling portion extending away from the corner portion in a lengthwise direction of the terminal coupling portion; and
      a fuse portion configured to pass a current therethrough and having a cross-sectional area that is smaller than that of other portions of the current collecting member,
   wherein the current collecting member has a fuse hole formed therein adjacent the fuse portion, a centerline of the fuse hole extending through the fuse portion in a direction oblique to the first direction, the fuse hole being asymmetric about a centerline of the terminal coupling portion extending in the lengthwise direction.

2. The rechargeable battery of claim 1, wherein the fuse hole is asymmetric with respect to a centerline of the fuse portion extending in the first direction.

3. The rechargeable battery of claim 1, wherein the fuse portion is formed at the terminal coupling portion.

4. The rechargeable battery of claim 1, wherein the rechargeable battery is adapted for use as a motor-driving power source for propelling an electric vehicle or a hybrid electric vehicle.

5. The rechargeable battery of claim 1, further comprising an electrode terminal electrically connected to the electrode assembly and protruding through the cap plate to an outside of the case, wherein the electrode terminal is coupled to the terminal coupling portion.

6. The rechargeable battery of claim 5, wherein the electrode terminal comprises:
   a flange between the terminal coupling portion and the cap plate; and
   a pillar extending from a first side of the flange and protruding through the cap plate to the outside of the case.

7. The rechargeable battery of claim 6,
   wherein the electrode terminal further comprises a support protrusion protruding from a second side of the flange opposite the first side, and
   wherein the terminal coupling portion has a hole formed therein, and the support protrusion is received in the hole to couple the terminal coupling portion and the electrode terminal together.

8. The rechargeable battery of claim 6, further comprising an insulation member between the current collecting member and the cap plate, wherein the insulation member has a first groove receiving the terminal coupling portion therein, a second groove receiving the flange therein, and a terminal hole receiving the pillar therethrough.

9. The rechargeable battery of claim 1,
   wherein the fuse hole includes a first fuse hole formed at a first side of the current collecting member, and a second fuse hole formed at a second side of the current collecting member opposite the first side, and
   wherein the fuse portion is between the first and second fuse holes.

10. The rechargeable battery of claim 9, wherein a distance between the first fuse hole and the corner portion is greater than a distance between the second fuse hole and the corner portion.

11. The rechargeable battery of claim 1, wherein the fuse portion comprises a first fuse portion at a first side of the current collecting member, and a second fuse portion at a second side of the current collecting member opposite the first side.

12. The rechargeable battery of claim 11, wherein a distance between the first fuse portion and the corner portion is greater than a distance between the second fuse portion and the corner portion.

13. The rechargeable battery of claim 11,
   wherein the fuse hole is formed between the first and second fuse portions, and
   wherein a distance between the corner portion and a first end of the fuse hole adjacent the first fuse portion is greater than a distance between the corner portion and a second end of the fuse hole adjacent the second fuse portion.

14. The rechargeable battery of claim 11, wherein the fuse hole is formed between the first and second fuse portions and includes a first fuse hole portion adjacent the first fuse portion, a second fuse hole portion adjacent the second fuse portion, and a third fuse hole portion extending between the first and second fuse hole portions.

15. The rechargeable battery of claim 14, wherein the first and second fuse hole portions extend in a direction substantially parallel to the first direction, and the third fuse hole portion extends between the first and second fuse hole portions in a direction oblique to the first direction.

16. A rechargeable battery comprising:
   an electrode assembly;
   a case containing the electrode assembly;
   a cap plate covering an opening of the case; and
   a current collecting member comprising:
      a current collecting portion coupled to the electrode assembly;
      a terminal coupling portion extending from the current collecting portion at a corner portion of the current collecting member, the corner portion extending in a first direction along a width of the current collecting member; and
      a fuse portion configured to pass a current therethrough and having a cross-sectional area that is smaller than that of other portions of the current collecting member,
   wherein the current collecting member has a fuse hole formed therein adjacent the fuse portion, a centerline of the fuse hole extending through the fuse portion in a direction oblique to the first direction,
   wherein the fuse hole includes a first fuse hole formed at a first side of the current collecting member, and a second fuse hole formed at a second side of the current collecting member opposite the first side,
   wherein the fuse portion is between the first and second fuse holes,
   wherein the fuse hole further includes a third fuse hole formed between the first and second fuse holes, and
   wherein the fuse portion comprises a first fuse portion between and separating the first fuse hole and the third fuse hole, and a second fuse portion between and separating the second fuse hole and the third fuse hole.

17. The rechargeable battery of claim 16, wherein a distance between the third fuse hole and the corner portion is greater than a distance between the first fuse hole and the corner portion and a distance between the second fuse hole and the corner portion.

* * * * *